US006884883B1

(12) United States Patent
Shima et al.

(10) Patent No.: US 6,884,883 B1
(45) Date of Patent: Apr. 26, 2005

(54) METHOD FOR REDUCING PULP TO POWDER AND PROCESS FOR THE PRODUCTION OF A CELLULOSE ETHER

(75) Inventors: Yukio Shima, Niigata-ken (JP); Mitsuo Narita, Niigata-ken (JP); Atsushi Hatayama, Niigata-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/605,815

(22) Filed: Jun. 28, 2000

(30) Foreign Application Priority Data

Jun. 29, 1999 (JP) .......................................... 11-182947

(51) Int. Cl.$^{7}$ .......................... C08B 37/00; C08B 3/22; C08B 11/00; C07H 1/00

(52) U.S. Cl. ............................ 536/56; 536/77; 536/84; 536/124

(58) Field of Search ............................ 536/56, 77, 84, 536/124; 241/28, 30

(56) References Cited

U.S. PATENT DOCUMENTS

| | | | |
|---|---|---|---|
| 2,663,907 A | * 12/1953 | Downing | |
| 3,649,292 A | * 3/1972 | Quame | 99/4 |
| 4,415,124 A | 11/1983 | Carduck et al. | |

FOREIGN PATENT DOCUMENTS

| | | |
|---|---|---|
| JP | 59-75901 | 4/1984 |
| JP | 89-07828 | 2/1989 |
| JP | 09-076233 A | 3/1997 |
| JP | 10 028890 | 2/1998 |

* cited by examiner

*Primary Examiner*—James O. Wilson
*Assistant Examiner*—Everett White
(74) *Attorney, Agent, or Firm*—Alston & Bird LLP

(57) ABSTRACT

Pulp is ground by means of a vertical roller mill. The average particle diameter of the resulting powdered pulp is adjusted to 20–300 $\mu$m. The powdered pulp thus obtained is used as a starting material for the production of cellulose ethers.

6 Claims, 1 Drawing Sheet

10
11
9
15
8
1
7
20
2
5
6
4
3

METHOD FOR REDUCING PULP TO POWDER AND PROCESS FOR THE PRODUCTION OF A CELLULOSE ETHER

BACKGROUND OF THE INVENTION

1. Field of the Invention

This invention relates to a method for reducing pulp to powder and thereby producing powder pulp for use, for example, in the production of cellulose ethers. Moreover, this invention also relates to a process for the production of a cellulose ether.

2. Description of the Related Art

In the production of cellulose ethers, highly purified cotton linter pulp and wood pulp are ground by means of a grinder such as a knife mill, and the resulting powdered pulps are used as starting materials.

As methods for grinding pulp finely, there have been proposed a method in which dried pulp is ground at low temperatures as described, for example, in Japanese Patent Provisional Publication No. 59-75901 and Japanese Patent Publication No. 64-7828; and a method in which compressed pulp is ground by means of a jet mill as described, for example, in Japanese Patent Publication No. 3-48010.

However, these methods are not satisfactory from an industrial point of view, because they involve a troublesome step (e.g., drying or compression) prior to grinding and are hence unsuitable for the treatment of large amounts of pulp, and because they require an apparatus for keeping the grinder at a low temperature and a refrigerant therefor.

In order to overcome these disadvantages, grinding in a knife mill is widely employed at present.

Usually, powdered cellulose ethers are used by dissolving them in a solvent such as water. The undissolved fiber content in an aqueous solution of a cellulose ether is considered to be dependent on the degree of uniformity to which an alkali permeates into powdered pulp during the preparation of an alkali cellulose. The undissolved fiber content in an aqueous solution of a cellulose ether may pose a problem during its use. Consequently, in order to reduce the undissolved fiber content, it is essential to cause an alkali to permeate uniformly into pulp and thereby prepare an alkali cellulose having a uniform alkali concentration.

Moreover, the permeation of an alkali into powdered pulp is considered to be affected by the particle shape of the powdered pulp. Grinding in a knife mill utilizing chiefly shearing force yields powdered pulp comprising long fibers when observed microscopically. Since a fibrous powder has a small surface area per particle, this limits the chance of contact between the pulp and the alkali, and acts adversely on the permeation of the alkali into the particles. Consequently, it is thought that the alkali fails to permeate uniformly into the powdered pulp and the degree of alkali permeation thereinto is limited.

Furthermore, in a fibrous powder, the fibers are intertwined with one another to give a large void volume and hence a low bulk density. Since the amount of pulp which can be used at a time in the production of a cellulose ether is limited, fibrous powdered pulp having a low bulk density is disadvantageous from the viewpoint of production. Accordingly, it is desired to develop a method for producing powdered pulp having as high a bulk density as possible on an industrial scale.

SUMMARY OF THE INVENTION

The present invention has been made in view of the above-described circumstances, and an object thereof is to reduce the undissolved fiber content in aqueous solutions of cellulose ethers and, at the same time, produce cellulose ethers stably by improving the productivity thereof.

The present inventors paid their attention to the fact that, since the shape of powdered pulp particles is greatly affected by the principle of grinding, the use of a pulp grinder based on a principle different from that of a knife mill utilizing shearing force can change particle shape and thereby improve the permeation of an alkali.

Accordingly, the present inventors made intensive investigations with a view to solving the above-described problems, and have now invented a method for reducing pulp to powder which comprises grinding pulp by means of a vertical roller mill to produce powdered pulp.

In the above-described grinding method of the present invention, the average particle diameter of the powdered pulp is preferably adjusted to 20–300 $\mu$m.

Moreover, in the present invention, the powdered pulp obtained according to the above-described method is used as a starting material for the production of cellulose ethers.

In the grinding method of the present invention, pulp is ground by means of a vertical roller mill to produce powdered pulp which has a shape different from the elongated fibrous form of the powdered pulp obtained by grinding in a knife mill or the like, and is hence suitable for use as a starting material for the production of cellulose ethers. Thus, the undissolved fiber content in aqueous solutions of cellulose ethers can be reduced and, at the same time, cellulose ethers can be stably produced by improving the productivity thereof.

DETAILED DESCRIPTION OF THE PREFERRED EMBODIMENT

Figure 1:
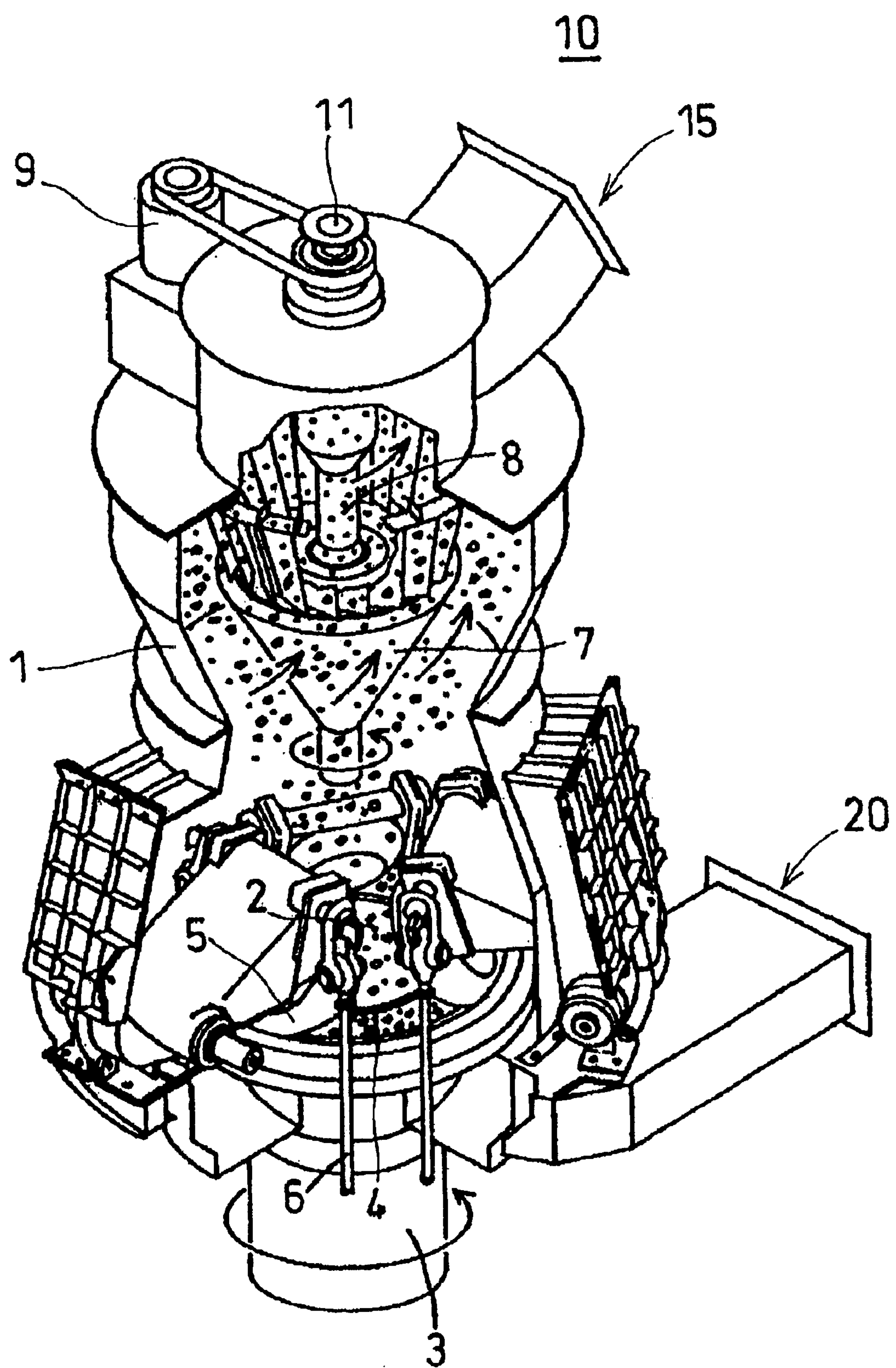
FIG. 1 is a perspective view of a vertical roller mill which can be used in the present invention.

An exemplary vertical roller mill which can be used in the present invention is more specifically explained below with reference to FIG. 1.

FIG. 1 is a perspective view of a vertical roller mill suitable for carrying out the method for reducing pulp to powder in accordance with the present invention. A turntable 2 is disposed in the lower part of a housing 1 and connected to a shaft 3. Shaft 3 is connected to a motor (not shown) on the outside of housing 1 so as to rotate turntable 2. Turntable 2 has a groove 4 along its outer periphery, and rollers 5 are disposed above groove 4. Rollers 5 are supported by arms 6, which are connected to cylinders (not shown) so as to press down rollers 5 into groove 4.

In the upper part of housing 1, a separator 7 for separating sufficiently ground and finely powdered pulp from coarsely ground pulp is installed. Separator 7 has a shaft 8, which is connected to a motor 9 on the outside of housing 1 so as to rotate separator 7.

Moreover, a raw material inlet 11 for feeding raw pulp and a product outlet 15 for discharging the resulting powdered pulp are provided in the upper part of housing 1, and an air inlet 20 for feeding air into housing 1 is provided in the lower part of housing 1.

By using this vertical roller mill 10, raw pulp can be reduced to powder in the following manner. When raw pulp is thrown into housing 1 through raw material inlet 11, it falls onto turntable 2 and is accumulated in groove 4 under the action of the centrifugal force exerted by turntable 2. The accumulated raw pulp is compressed and ground between rollers 5 and groove 4, and thereby reduced to powder. In the interior of housing 1, the air fed through air inlet 20 produces a whirling upward current of air, so that the resulting powdered pulp is carried by the whirling upward current of air and lifted to the upper part of housing 1. During this process, insufficiently ground and coarsely powdered pulp is also lifted to the upper part of housing 1, but sufficiently ground and finely powdered pulp alone can pass through the slits of separator 7. The powdered pulp so classified, together with the current of air, is discharged from product outlet 15 to the outside of housing 1. The powdered pulp so discharged is collected in a bag filter.

The grinding principle of a roller mill involves compression, shearing and grinding. When observed microscopically, the resulting powdered pulp comprises shorter fibers as compared with the powdered pulp obtained by grinding in a knife mill, and particles obtained by grinding or compression. This causes a reduction in void volume. Consequently, while grinding in a knife mill yields powdered pulp having an apparent density (loose) of 0.05 to 0.13 g/cm$^3$, grinding in a roller mill yields powdered pulp having a bulk density of as high as 0.14 to 0.30 g/cm$^3$. Accordingly, when a reaction vessel having a fixed internal volume is used, a greater amount of powdered pulp may be used at a time for the purpose of producing a cellulose ether.

As the raw pulp, there may be used cotton linter pulp and wood pulp which are commonly used for the production of cellulose ethers. However, it is to be understood that the present invention is not limited thereto. The raw pulp may have any suitable size and shape. For example, the raw pulp may be in the form of square chips having a size of about 1 to 2 cm, but the present invention is not limited thereto.

The aforesaid powdered pulp has an average particle diameter of 20 to 300 $\mu$m and preferably 60 to 200 $\mu$m. If the average particle diameter is less than 20 $\mu$m, not only the use of such powdered pulp will be inefficient from an industrial point of view, but also the powdered pulp show a significant reduction in the degree of polymerization and hence exert an influence on the viscosity of an aqueous solution of the resulting cellulose ether. If it is greater than 300 $\mu$m, this will adversely affect fluidity in the reactor and alkali absorption during the production of a cellulose ether, thus contributing to an increase in undissolved fiber content.

By using the powdered pulp thus obtained, it is possible to form an alkali cellulose into which an alkali has permeated more uniformly, and thereby reduce the undissolved fiber content in an aqueous solution of the resulting cellulose ether.

Cellulose ethers may be produced in the well-known manner, for example, by adding an alkali (e.g., sodium hydroxide or potassium hydroxide) to raw pulp so as to form an alkali cellulose, and then adding thereto an etherifying agent such as methyl chloride, propylene oxide or ethylene oxide.

The method for reducing pulp to powder in accordance with the present invention makes it possible to produce industrially advantageous powdered pulp having high bulk density, with high productivity and good stability. Moreover, when a cellulose ether is produced by using this powdered pulp as a starting material, it is possible to reduce the undissolved fiber content in an aqueous solution of the cellulose ether.

The present invention is further illustrated by the following examples and comparative examples. These examples are not to be construed to limit the scope of the invention.

EXAMPLE 1 AND COMPARATIVE EXAMPLE 1

Using an IHI vertical pulverization mill (IS Mill, manufactured by Ishikawajima Harima Heavy Industries Co., Ltd.) as a vertical roller mill, raw pulp was thrown thereinto and ground. The raw pulp was in the form of square chips having a size of about 1 to 2 cm, but no particular limitation is placed on the form of the raw pulp. After grinding, the powdered pulp was collected in a bag filter. The powdered pulp thus obtained was used as a staring material for the production of hydroxypropyl methylcellulose.

The process employed in the example for producing the cellulose ether was as follows: Sodium hydroxide was added to the powdered pulp so as to form an alkali cellulose. Then, methyl chloride for replacement with methoxyl and propylene oxide for replacement with hydroxypropoxyl were added thereto and reacted therewith. The resulting hydroxypropyl methylcellulose was purified until its residual salt content was reduced to about 1% by weight, and then dried until its moisture content reached 1.2% by weight.

The dried hydroxypropyl methylcellulose was pulverized in a batch type vibration mill (B-3, manufactured by Chuo Kakoki Co., Ltd.) for 2 hours. The resulting powdered hydroxypropyl methylcellulose was formed into an aqueous solution having a concentration of 2% by weight and used to measure its light transmittance.

For purposes of comparison, pulp was ground by means of a mesh mill (HA-2542, manufactured by Hourai Tekkosho, Ltd.). For both grinders, each of cotton linter pulp and wood pulp was used as the raw pulp. The average particle diameter and bulk density of each powdered pulp and the light transmittance of an aqueous solution of each powdered hydroxypropyl methylcellulose (abbreviated as "HPMC" in Table 1) are shown in Table 1.

Bulk density was measured in the following manner, using a Model PT-E Hosokawa Powder Tester (manufactured by Hosokawa Micron Corporation).

After the Hosokawa Powder Tester was set in the mode for the measurement of apparent specific gravity (loose), an appropriate amount (about 40 g) of a sample was gently placed on the sieve with a special-purpose scoop, and the indicator of the rheostat was set (at 2.5) so as to give a flow rate at which the cup (100 cm$^3$) was filled with the falling sample to overflowing in 20–30 seconds. After any excess sample was scraped off from the cup with a vertically standing blade, and any sample powder attached to the cup was swept off with a brush, the cup filled with the sample was weighed to a precision of 0.1 g with an even balance. Then, the apparent specific gravity of the sample was calculated according to the following equation.

$$\text{Apparent specific gravity (loose)} = \frac{A - B}{100}$$

wherein A is the combined weight (g) of the sample and the cup, and B is the tare weight (g) of the cup.

Light transmittance was measured with visible light, using a Model PC-50 Photoelectric Colorimeter having a cell thickness of 20 mm.

EXAMPLE 2 AND COMPARATIVE EXAMPLE 2

The same procedure as described above was carried out, except that, in place of the cotton linter pulp, wood pulp was used as the raw pulp.

TABLE 1

| | Properties of powdered pulp | | | |
|---|---|---|---|---|
| | Raw pulp | Average particle diameter (μm) | Bulk density ($g/cm^3$) | Properties of powdered HPMC Light transmittance |
| Example 1 | Cotton linter pulp | 93 | 0.139 | 92.7 |
| Example 2 | Wood pulp | 68 | 0.196 | 96.6 |
| Comparative Example 1 | Cotton linter pulp | 225 | 0.098 | 89.4 |
| Comparative Example 2 | Wood pulp | 115 | 0.127 | 91.7 |

As shown in Table 1, the powdered pulps obtained by grinding in a vertical roller mill had a smaller average particle diameter and a higher bulk density than those obtained by grinding in a knife mill. Moreover, the hydroxypropyl methylcellulose produced by using the pulp ground in a roller mill gave an aqueous solution having a higher light transmittance.

Accordingly, it may be said that powdered pulp having an appropriate average particle diameter and hence a higher bulk density than conventional can be obtained by grinding pulp according to the method of the present invention and this powdered pulp is suitable for the production of cellulose ethers.

What is claimed is:

1. A method for reducing pulp to powder which comprises grinding pulp or means of a vertical roller mill to produce powdered pulp, wherein the pulp is selected from the group consisting of cotton linter pulp and wood pulp.

2. A method for reducing pulp to powder as claimed in claim 1 wherein the powdered pulp has an average particle diameter of 20 to 300 μm.

3. A method for reducing pulp to powder as claimed in claim 1 wherein the powdered pup has an average particle diameter of 60 to 200 μm.

4. A process for the production of a cellulose ether, comprising obtaining a powdered pulp by a method as claimed in claim 1, and producing cellulose ether by using the powdered pulp as a starting material.

5. A process for the production of a cellulose ether, comprising obtaining a powdered pulp by a method is claimed in claim 2, and producing cellulose ether by using the powdered pulp as a starting material.

6. A process for the production of a cellulose ether, comprising obtaining a powdered pulp by a method as claimed in claim 3, and producing cellulose either by using the powdered pulp as a starting material.

* * * * *